US007420344B2

(12) United States Patent

Zhong

(10) Patent No.: US 7,420,344 B2

(45) Date of Patent: Sep. 2, 2008

(54) INTELLIGENT SHIFT PAPER SHREDDING MECHANISM AND METHOD OF AUTOMATIC SHIFT OF THE SAME

(76) Inventor: Fenqiang Zhong, Floor 22, Block B, High-Tech Building, No. 908 Tian He North Road, Guangzhou City, Guangdong Province, P.R. (CN) 510630

( * ) Notice: Subject to any disclaimer, the term of this patent is extended or adjusted under 35 U.S.C. 154(b) by 262 days.

(21) Appl. No.: 11/433,957

(22) Filed: May 15, 2006

(65) Prior Publication Data

US 2007/0164135 A1 Jul. 19, 2007

(30) Foreign Application Priority Data

Jan. 17, 2006 (CN) ........................ 2006 1 0032914

(51) Int. Cl.
*H02P 5/00* (2006.01)
*B02C 25/00* (2006.01)

(52) U.S. Cl. ........................ 318/434; 318/438; 318/729; 241/36; 241/37.5

(58) Field of Classification Search ................. 318/434, 318/438, 729, 809; 241/30, 36, 37.5
See application file for complete search history.

(56) References Cited

U.S. PATENT DOCUMENTS 5,186,398 A * 2/1993 Vigneaux, Jr. ............... 241/33
5,561,356 A * 10/1996 Nanos ........................ 318/729
6,997,408 B2 * 2/2006 Watano et al. ................ 241/30
2003/0057305 A1 * 3/2003 Watano et al. ................ 241/36
2006/0027689 A1 * 2/2006 Watano et al. ................ 241/36
2007/0125892 A1 * 6/2007 Chen ......................... 241/37.5

* cited by examiner

*Primary Examiner*—Paul Ip
(74) *Attorney, Agent, or Firm*—Thomas, Kayden, Horstemeyer & Risley, LLP

(57) ABSTRACT

An intelligent shift paper shredding mechanism and a method of automatic shift of the same in accordance with the present invention includes a control circuit including a control chip electrically connecting with a shift circuit and a locked-stator detect circuit. The shift circuit electrically connects with a motor. The method of adjusting power of the motor includes steps of: a) turning on the highest tap position switch circuit to initiate the motor; b) automatically switching to the lowest tap position switch circuit after a predetermined time delay; c) when the locked-rotor detect circuit detecting the current tap position cannot shred papers, automatically switching to higher tap position switch circuit, repeating this step until to the highest tap position switch circuit, otherwise keeping on the electrical connection to the current tap position switch circuit; d) when the locked-rotor detect circuit detecting a paper jam, automatically turning on a normal-reverse switch circuit and corresponding tap position switch circuit at the same time to exit the jammed papers. The cooperation between the shift circuit and the locked-rotor detect circuit realizes the goal of adjusting power of the motor intelligently according to different quantities of the papers, and thus, makes the paper shredder in which the paper shredding mechanism is used more economic in energy.

11 Claims, 4 Drawing Sheets

INTELLIGENT SHIFT PAPER SHREDDING MECHANISM AND METHOD OF AUTOMATIC SHIFT OF THE SAME

BACKGROUND OF THE INVENTION

1. Field of the Invention

The present invention generally relates to a paper shredder, and more particularly to an intelligent shift paper shredding mechanism and method of automatic shift of the same.

2. Description of the Related Art

A paper shredder is one of the most common equipments used in an office.

A paper shredding mechanism adopted in the paper shredder usually comprises a motor, gears, cutting shafts, corresponding control circuits, and outer power source for the motor. The gears connect with the cutting shafts, the control circuits control the turn on/off of the power source for the motor via a switch circuit. When use, user firstly needs to turn on the power source to initiate the motor in a start position. When user feeds paper into the inlet opening of the paper shredder, a paper feed detect circuit arranged in the control circuits detects the papers to be shredded and transmits signal to the switch circuit which is capable of actuating the motor, thus the motor begins shredding the papers.

Such operating principle of the paper shredder is relatively simple, corresponding questions are caused, however. When shredding paper, in spite of the quantity of the papers to be shredded in the inlet opening of the paper shredder, the motor always operates at relatively-high uniform power over a long period of time. In fact, the necessary powers for papers with different quantities are different. When the quantity of the papers to be shredded is larger than the load of the motor, the motor may be caused to be laid off. While the quantity of the papers to be shredded is too little, the motor power will be wasted too much. The paper shredder in ordinary use does not utilize the motor fully in each time of shredding papers, thus, this kind of paper shredder wastes electric energy in great extent.

BRIEF SUMMARY OF THE INVENTION

Accordingly, an object of the present invention is to provide an intelligent shift paper shredding mechanism and the method of automatic shift of the same which is capable of adjusting the power of a motor according to the quantity of papers to be shredded, thus, economizing power for the paper shredder.

In order to achieve the above-mentioned object, an intelligent shift paper shredding mechanism in accordance with the present invention comprises a motor, gears, cutting shafts and corresponding control circuits. The motor electrically connects with an outer power source through the control circuits and connects with the cutting shafts through the gears. The control circuits comprise a control chip electrically connecting with a shift circuit and a locked-rotor detect circuit. The shift circuit electrically connects with the motor. The control chip is capable of adjusting power of the motor according to the paper feeding status detected by the locked-rotor detect circuit. The control chip is a single-chip type.

The shift circuit comprises a rheostat, a normal-reverse switch circuit electrically connecting with the rheostat and a plurality of tap position switch circuits all electrically connecting with the rheostat. The normal-reverse switch circuit and the tap position switch circuits all electrically connect with the control chip. In view of cost and technology factors, relay circuits are adopted to serve as the normal-reverse switch circuit and the tap position switch circuits.

A controllable silicon circuit is also considerable to serve as the shift circuit.

In addition, to make the intelligent shift paper shredding mechanism function, a method of automatic shift of the same comprises the steps of:

a) turning on any one of the tap position switch circuits to initiate the motor;
b) automatically switching to the lowest tap position switch circuit after a determined time delay;
c) when the locked-rotor detect circuit detecting the current tap position cannot shred papers, automatically switching to a higher tap position switch circuit, repeating this step until to the highest tap position switch circuit, otherwise keeping on the electrical connection to the current tap position switch circuit; and
d) when the locked-rotor detect circuit detecting a paper jam, automatically turning on a normal-reverse witch circuit and corresponding tap position switch circuit at the same time to exit the jammed papers.

In step d, the corresponding tap position switch circuit turned on with the normal-reverse witch circuit at the same time is the highest tap position switch circuit.

After each time of paper shredding, the control chip sends out order to turn on the lowest tap position switch circuit to keep the motor operating in the lowest power.

The cooperation between the shift circuit and the locked-rotor detect circuit realizes the goal of adjusting power of the motor intelligently according to different quantities of the papers, and thus, makes the paper shredder in which the paper shredding mechanism is used more economic in energy.

Other objects, advantages and novel features of the invention will become more apparent from the following detailed description of the present embodiment when taken in conjunction with the accompanying drawings.

DETAILED DESCRIPTION OF THE INVENTION

Figure 1:
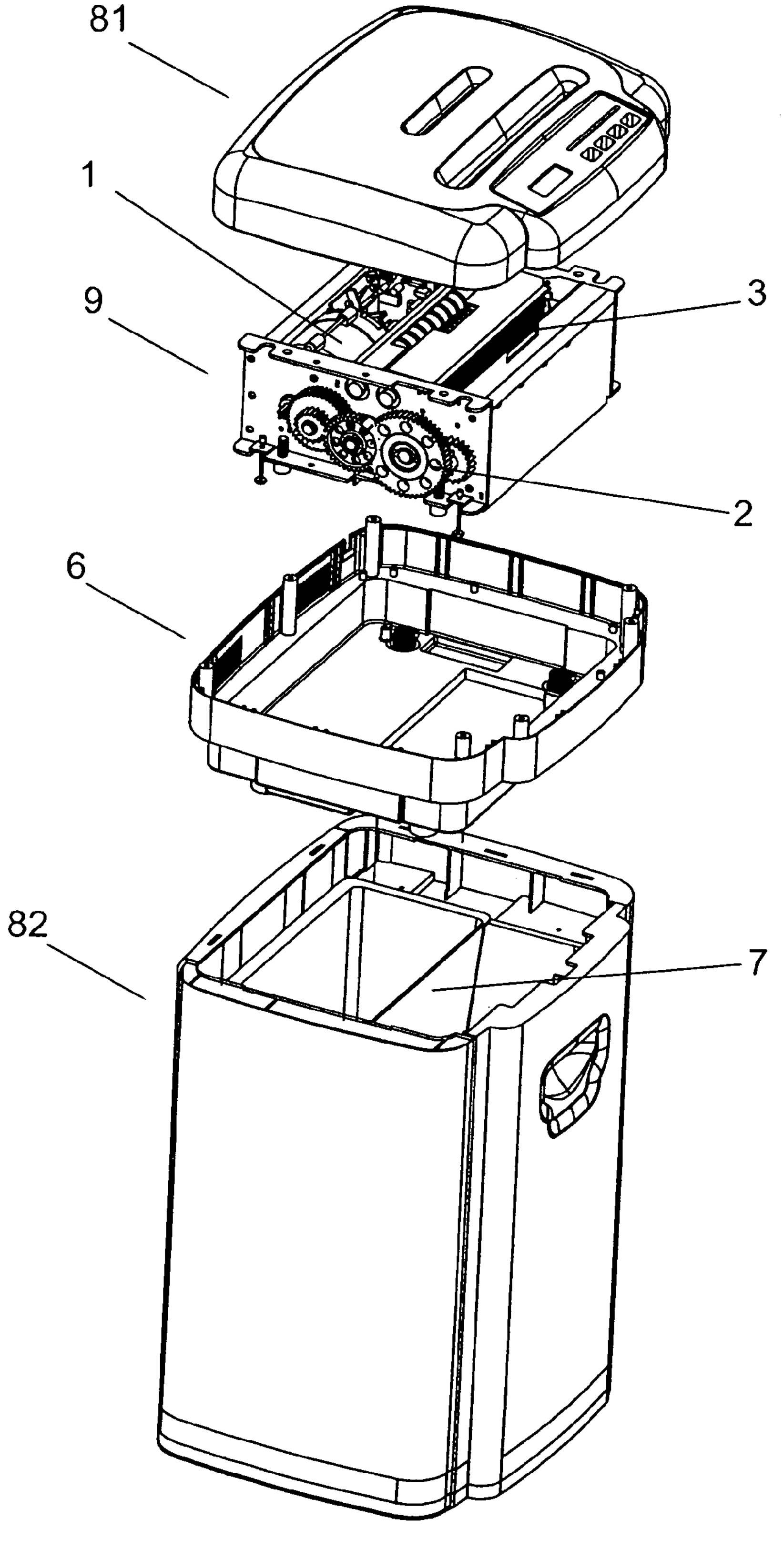
FIG. 1 is a perspective view of a paper shredder adopting a paper shredding mechanism in accordance with the present invention.

Reference will now be made to the drawing figures to describe the present invention in detail.

Figure 2:
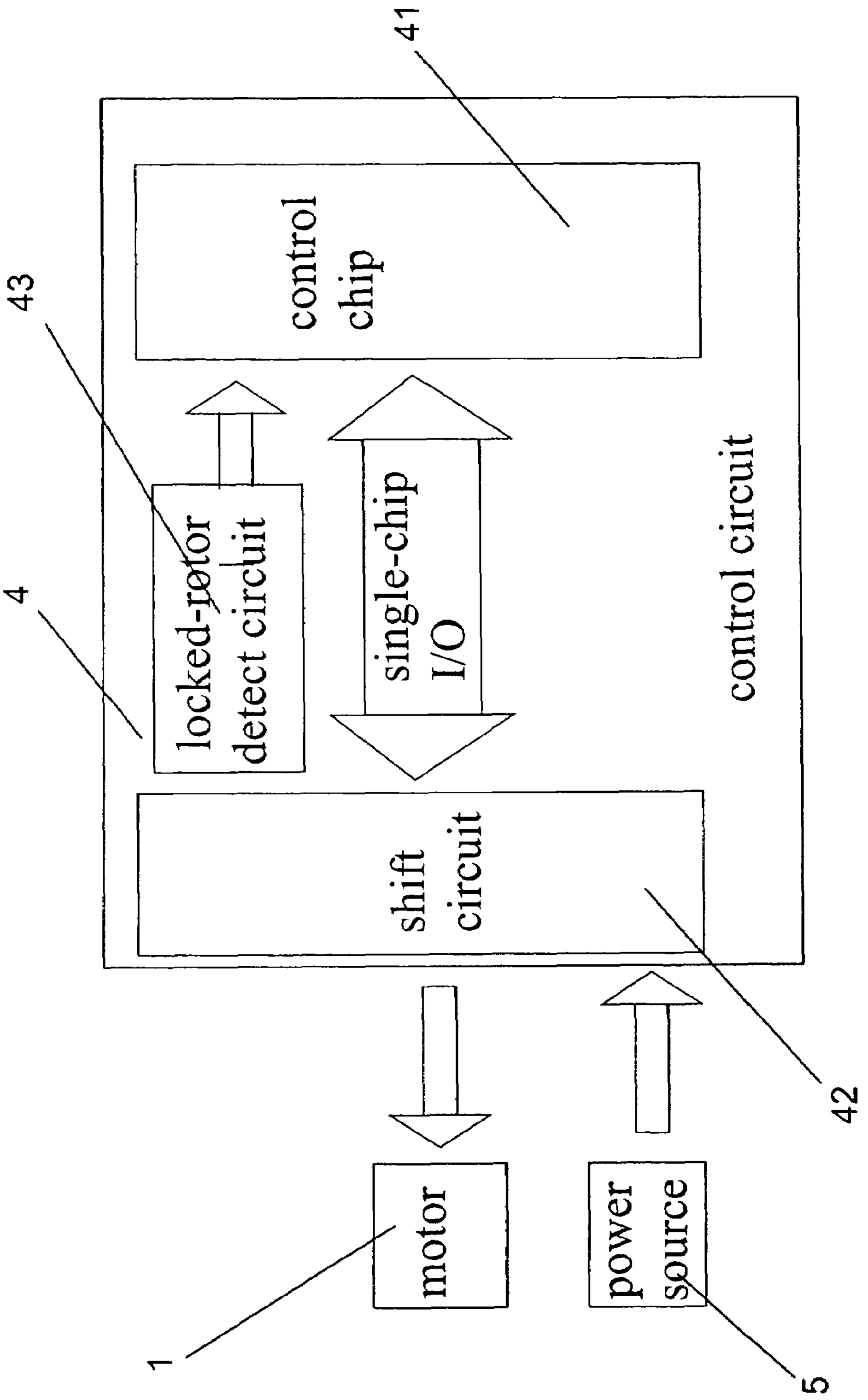
FIG. 2 is a schematic circuit principle view of the present invention.

Referring to FIGS. 1-2, an intelligent shift paper shredding mechanism 9 is used in a kind of paper shredder-and comprises a motor 1, gears 2, cutting shafts 3 and corresponding control circuits 4, and an outer power source 5. The motor 1 connects with the outer power source 5 through the control circuits 4 and connects with the cutting shafts 3 through the gears 2. The paper shredding mechanism 9 is mounted to a base 81 which has a shredded paper bucket 7 inside through a bottom shell 6. The top shell of the paper shredding mechanism 9 has a top cover 82 capable of latching or fastening with the base 81. When the paper shredding mechanism 9 in operation, initiating the motor 1 to drive the gears 2 then further drive the cutting shafts 3 to rotate, thus achieves the goal of shredding papers.

Please refer to FIG. 2, the control circuits 4 comprise a control chip 41 preferably a single-chip type and electrically connecting with a shift circuit 42 and a locked-rotor detect circuit 43. The shift circuit 42 electrically connects with the motor 1, and the control chip 41 controls the shift circuit 42 to adjust the power of the motor 1 according to the paper feeding status detected by the locked-rotor detect circuit 43.

Figure 3:
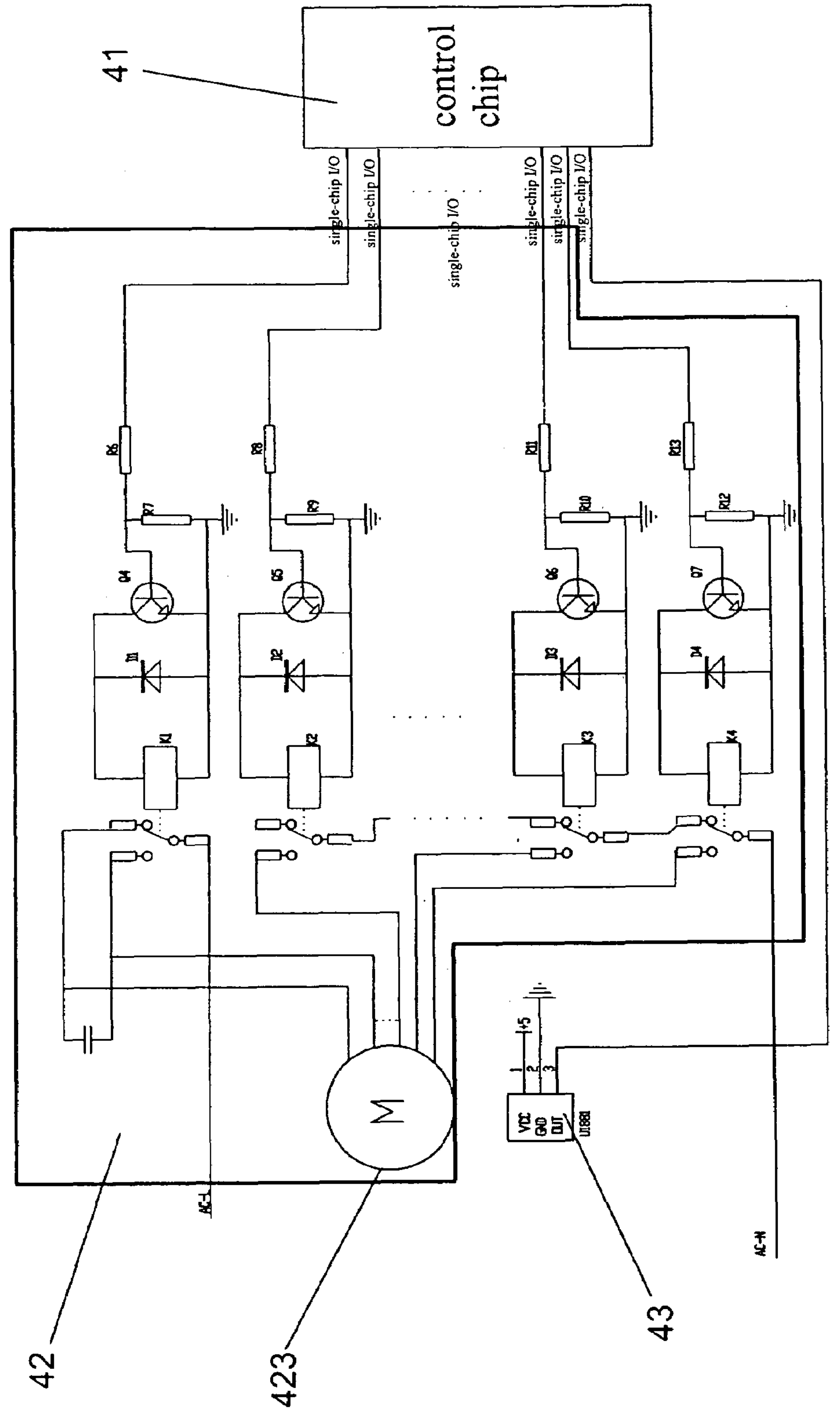
FIG. 3 is a schematic circuit principle view of the first embodiment of the present invention which adopts relay circuits served as switch circuits.

Now in conjunction with FIGS. 2-3, the shift circuit 42 comprises a rheostat 423, a normal-reverse switch circuit and a plurality of tap position switch circuits. The normal-reverse switch circuit and the tap position switch circuits all electrically connect with the rheostat 423 and the control chip 41 to realize the electrical connection between the shift circuit 42 and the control chip 41.

Referring to FIG. 3, relay circuits are adopted in the present invention to serve as the normal-reverse circuit and the tap position switch circuits. The relay circuits comprise a reverse switch K1, a low-power switch K2, a middle-power switch K3 and a high-power switch K4, totally four relay switches, to be electrically arranged between the control chip 41 an the rheostat 423 of the shift circuit 42.

The present invention realizes the automatic shift function following the method as follows:

a) turning on the highest tap position switch circuit to initiate the motor 1. The high-power switch K4 is on, while the middle-power switch K3, the low-power switch K2 and the reverse switch K1 are all off;

b) after a predetermined time delay, the control circuits 4 automatically switching to the lowest tap position switch circuit to keep the motor operating in lowest power, and now only the low-power switch K2 is on;

c) when the locked-rotor detect circuit 43 detecting the current tap position cannot shred the papers, automatically switching to a higher tap position switch circuit, repeating this step until switching to the highest tap position, otherwise keeping on the connection to the current tap position switch; and d) when the locked-rotor detect circuit 43 detecting a paper jam, automatically turning on the normal-reverse switch circuit and corresponding tap position switch circuit at the same time to exit the jammed papers. Now only the normal-reverse switch circuit and the high-power switch are on. In this step, when the quantity of the jammed papers is relatively small, other tap position switch circuits are also preferable to actuate the papers to be exited. However, the highest tap position switch circuit is most secure.

After the paper shredding of each time, the control chip 41 sends out order to turn on the lowest tap position switch circuit to keep the motor 1 operating in the lowest power. If paper feeding status is detected by the locked-rotor detect circuit 43 in three seconds, the motor 1 still starts from the highest tap position to continue shredding papers and repeats the steps a to d. If no paper feeding status is detected, the motor 1 will stop operation after three seconds, all relay switches are off and the system enters into start position.

The locked-rotor detect circuit 43 is skilled in the art and is mainly used to detect the status of the motor 1, such as rotating in the forward direction, rotating in the reverse direction, rotating in lower speed or stop et al, and transmits the signals to the control chip 41. The control chip 41 may operate the automatic shift according to the signals transmitted by the locked-rotor detect circuit 43.

The rheostat 423 is also skilled in the art and the operation principle is only explained briefly hereinafter.

The principle of shift through the rheostat is realized by changing the operating points of the taps of the rheostat to alter the number of turns of the windings, that is to alter the number of turns of the auxiliary winding to weaken the Magnetic Field Intensity of the stator to achieve above object. In the present invention, the shift through the rheostat has three windings, a main winding, a media winding and an auxiliary winding. These three windings are capable of being altered to form L-type and T-type. The L-type also has two types, L1 and L2.

Please refer to FIGS. 2 and 4 again, FIG. 4 illustrates the second embodiment of the present invention. Controllable silicon circuits are adopted to serve as the shift circuit and are skilled in the art itself. Now, detailed description of the combination of the controllable silicon circuits to the paper shredding mechanism 9 and the operation principle are given below.

Figure 4:
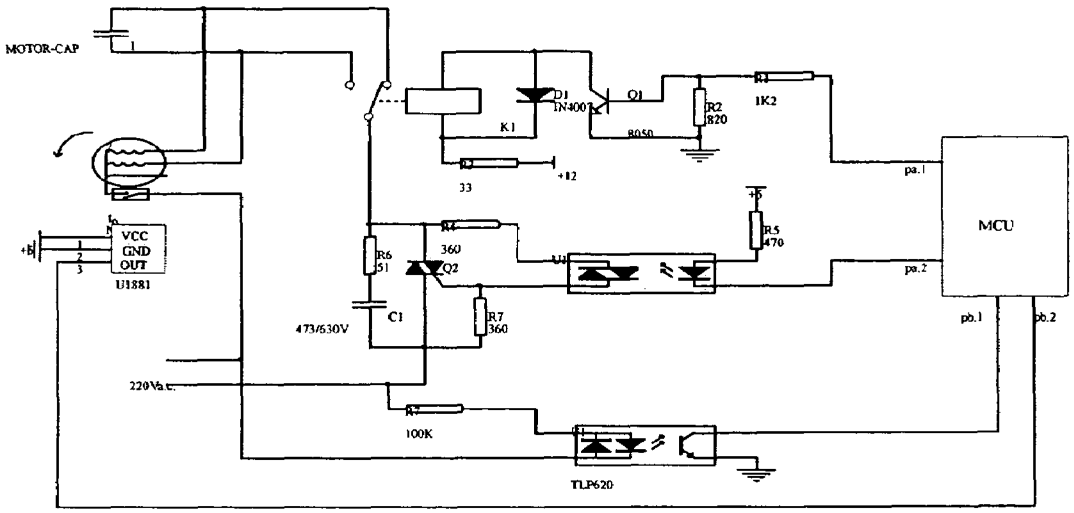
FIG. 4 is a schematic circuit principle view of the second embodiment of the present invention which adopts controllable silicon circuits served as switch circuits.

In FIG. 4, Q2 is a triac and the conduction angle thereof is controllable to control the operation power of the motor. Under different operation powers, the temperature rises of the motor are different. Thus, under low power, the motor is of low power, low heat quantity and long operation time; while under high power, the motor is of high power, large heat quantity and short operation time.

When the commercial source 220-volt is cross zero, R1 and U1 consists a cross-zero detect circuit. When a control chip MCU detects that the commercial source is cross-zero from the footprint pb.1, the footprint pb.2 outputs pulse to trigger the triac Q2 after a delay of a few of millisecond. The delay time is between 0~10 milliseconds, and the longer the delay time is, the bigger the phase-shifted trigger of the triac Q2 is, and the lower the operation power of the motor is. The footprint pb.2 connects with the Hall element U1881 for detecting the rotation speed of the motor. When the rotation speed becomes lower, the control chip MCU may adjust the delay time in time, therefore, adjust the operation power of the motor to achieve the goal of inverse ratio between the quantity of the shredded papers and the time of shredding papers.

It is apparent that the present invention can make the paper shredder in which it is applied more economic on energy and environmental protection, thus more popular.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An intelligent shift paper shredding mechanism, comprising:

a motor;

gears;

cutting shafts; and corresponding control circuits, the motor electrically connecting with an outer power source through the control circuits and electrically connecting with the cutting shafts through the gears; and wherein the control circuits comprise a control chip, said control chip electrically connects with a shift circuit and a locked-rotor detect circuit, said shift circuit electrically connects with the motor and the control chip controls the shift circuit to adjust the power of the motor according to the paper feeding status detected by the locked-rotor detect circuit.

2. The intelligent shift paper shredding mechanism as claimed in claim 1, wherein said control chip is of a single-chip type.

3. The intelligent shift paper shredding mechanism as claimed in claim 2, wherein said shift circuit comprises a rheostat, a normal-reverse switch circuit electrically connecting with the rheostat and at least two tap position switch circuits electrically connecting with the rheostat, and wherein the normal-reverse switch circuit and the at least two tap position switch circuits respectively electrically connect with the control chip.

4. The intelligent shift paper shredding mechanism as claimed in claim 1, wherein said normal-reverse switch circuit and the at least two tap position switch circuits are all of relay circuits.

5. The intelligent shift paper shredding mechanism as claimed in claim 2, wherein said normal-reverse switch circuit and the at least two tap position switch circuits are all of relay circuits.

6. The intelligent shift paper shredding mechanism as claimed in claim 3, wherein said normal-reverse switch circuit and the at least two tap position switch circuits are all of relay circuits.

7. The intelligent shift paper shredding mechanism as claimed in claim 1, wherein said shift circuit is a controllable silicon circuit.

8. The intelligent shift paper shredding mechanism as claimed in claim 2, wherein said shift circuit is a controllable silicon circuit.

9. A method of automatic shift of the intelligent shift paper shredding mechanism as claimed in claim 3, comprises the steps of:

a) turning on anyone of the at least two tap position switch circuits to initiate the motor;

b) automatically switching to the lowest tap position switch circuit after a predetermined time delay;

c) when the locked-rotor detect circuit detecting the current tap position cannot shred the papers, automatically switching to a higher tap position switch circuit, and repeating this step until switching to the highest tap position, otherwise keeping on the connection to the current tap position switch circuit; and d) when the locked-rotor detect circuit detecting a paper jam, automatically turning on the normal-reverse switch circuit and corresponding tap position switch circuit at the same time to exit the jammed papers.

10. The method of automatic shift of the intelligent shift paper shredding mechanism as claimed in claim 9, wherein said corresponding tap position switch circuit turned on together with the normal-reverse switch circuit in step d is the highest tap position switch circuit.

11. The method of automatic shift of the intelligent shift paper shredding mechanism as claimed in claim 10, wherein the control chip sends out an order to turn on the lowest tap position switch circuit after each time of paper shredding.

* * * * *